United States Patent [19]
Imai et al.

[11] Patent Number: 6,014,392
[45] Date of Patent: Jan. 11, 2000

[54] DRIVE CIRCUIT FOR ELECTRO-ABSORPTION MODULATOR AND OPTICAL TRANSMITTER EMPLOYING THE SAME

[75] Inventors: Keisuke Imai, Kawasaki; Akihiko Hayashi, Yokohama, both of Japan

[73] Assignee: Fujitsu Limited, Kawasaki, Japan

[21] Appl. No.: 09/037,062

[22] Filed: Mar. 9, 1998

[30] Foreign Application Priority Data

Oct. 20, 1997 [JP] Japan .................................. 9-287403

[51] Int. Cl.$^7$ ...................................................... H01S 3/00
[52] U.S. Cl. ............................................. 372/38; 372/26
[58] Field of Search .................. 372/38, 26, 31

[56] References Cited

U.S. PATENT DOCUMENTS

| | | | |
|---|---|---|---|
| 4,460,249 | 7/1984 | Vincent | 372/26 |
| 5,276,671 | 1/1994 | Minami et al. | 372/38 |
| 5,315,606 | 5/1994 | Tanaka | 372/38 |
| 5,602,665 | 2/1997 | Asako | 372/38 |
| 5,675,599 | 10/1997 | Abe et al. | 372/38 |
| 5,706,116 | 1/1998 | Sugata | 372/38 |
| 5,706,117 | 1/1998 | Imani et al. | 372/38 |
| 5,736,844 | 4/1998 | Yanagisawa | 372/38 |
| 5,757,831 | 5/1998 | Kmetec et al. | 372/26 |
| 5,778,015 | 7/1998 | Gunning et al. | 372/26 |
| 5,917,637 | 6/1999 | Ishikawa et al. | 372/26 |

*Primary Examiner*—Leon Scott, Jr.
*Attorney, Agent, or Firm*—Staas & Halsey LLP

[57] ABSTRACT

The present invention relates to A drive circuit can stabilize a bias voltage of an optical modulator to realize long distance transmission by preventing degradation of waveform, even if there is a dispersion on a characteristic of an electro-absorption modulator according to temperature and a secular change. The drive circuit supplies a driving voltage to an electro-absorption modulator which adsorbs a carrier light, depending on the driving voltage and outputting an intensity-modulated signal, and a peak value detector for detecting a peak value of a voltage at an anode of the electro-absorption modulator, and a bias current supplying circuit for supplying a bias current to control the driving voltage according to a difference between the peak value detected by the peak value detector and a predetermined value.

8 Claims, 12 Drawing Sheets

LD: LASER LIGHT SOURCE
EA: ELECTRO-ABSORPTION MODULATOR
DRV: DRIVE CIRCUIT FOR OPTICAL MODULATOR

DRIVING VOLTAGE Vm (NEGATIVE VOLTAGE)

DRIVE CIRCUIT FOR ELECTRO-ABSORPTION MODULATOR AND OPTICAL TRANSMITTER EMPLOYING THE SAME

BACKGROUND OF THE INVENTION

1. Field of the Invention

The Present invention relates to a drive circuit for electro-absorption modulator and an optical transmitter using the same. More particularly, it relates to a drive circuit which can stabilize a bias voltage in the optical modulator and prevent degradation in waveform to realize long distance transmission, and an optical transmitter using the same.

1. Description of the Related Art

An external optical modulation system has been developed to realize a super high speed optical transmission system on 1.55 μm wavelengths where transmission loss can be reduced.

An electro-absorption modulator has been proposed as an external optical modulator which can be driven with low power and is suitable to reduce the size of the modulator. The electro-absorption modulator absorbs a carrier light according to an applied voltage to generate an intensity-modulated optical signal.

Figure 7:
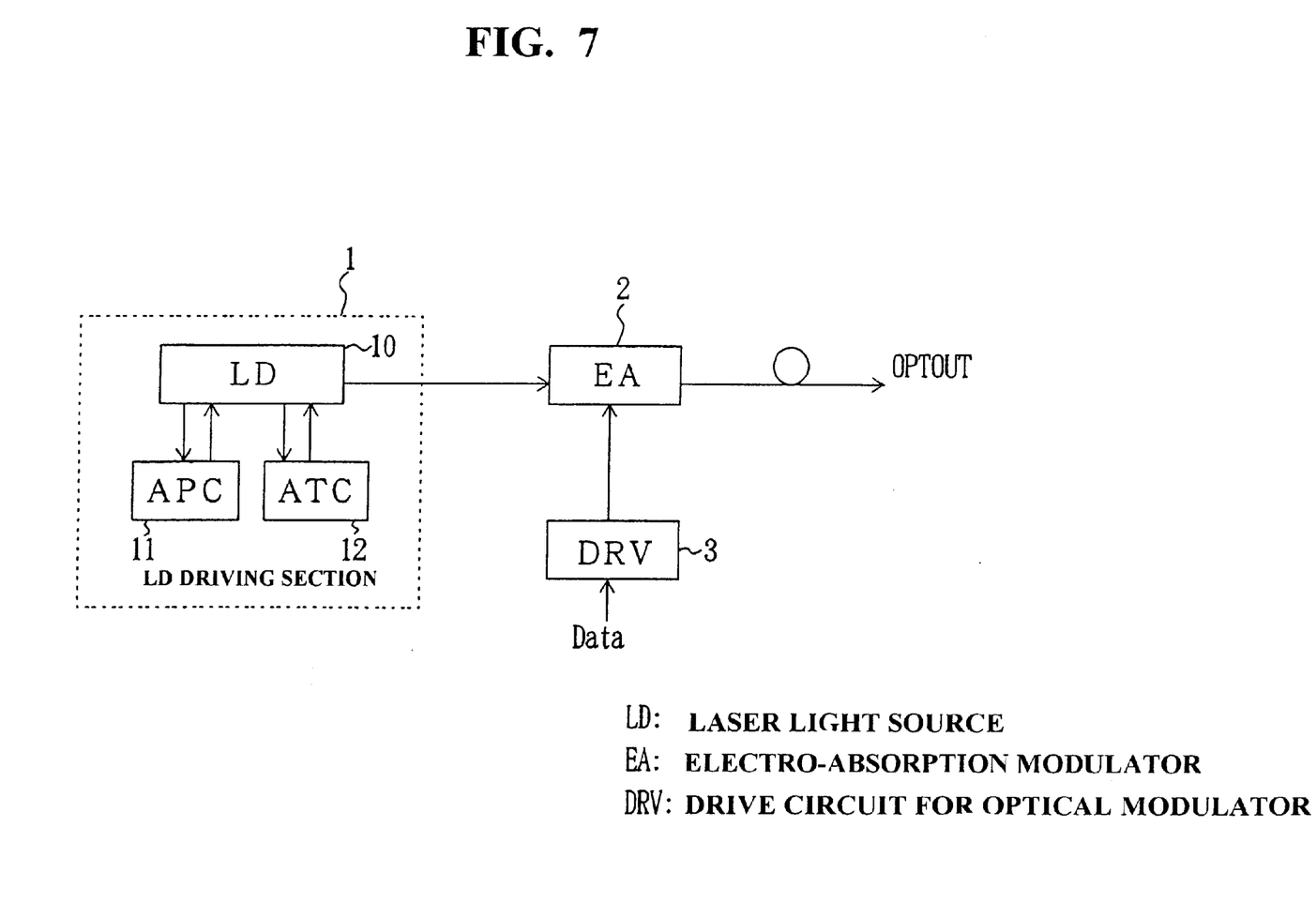
FIG. 7 is a structural block diagram of an optical transmitter employing the electro-absorption modulator.

FIG. 7 shows a structural block diagram of an optical transmitter employing the above-described electro-absorption modulator. In FIG. 7, a laser drive circuit 1 is formed of a laser light source 10 of which optical power is constantly controlled by an automatic power controller 11 and temperature is constantly controlled by an automatic temperature controller 12.

A carrier light radiated from laser light source 10 in laser drive circuit 1 is inputted to an optical modulator 2 formed of electro-absorption modulator EA. A drive circuit 3 supplies a driving voltage corresponding to an input signal Data to electro-absorption modulator EA in optical modulator 2.

Electro-absorption optical modulator EA absorbs the carrier light radiated from laser light source 10, i.e., it modulates the carrier light radiated from laser light source 10, according to the level of the driving voltage supplied from the drive circuit 3.

Figure 8:
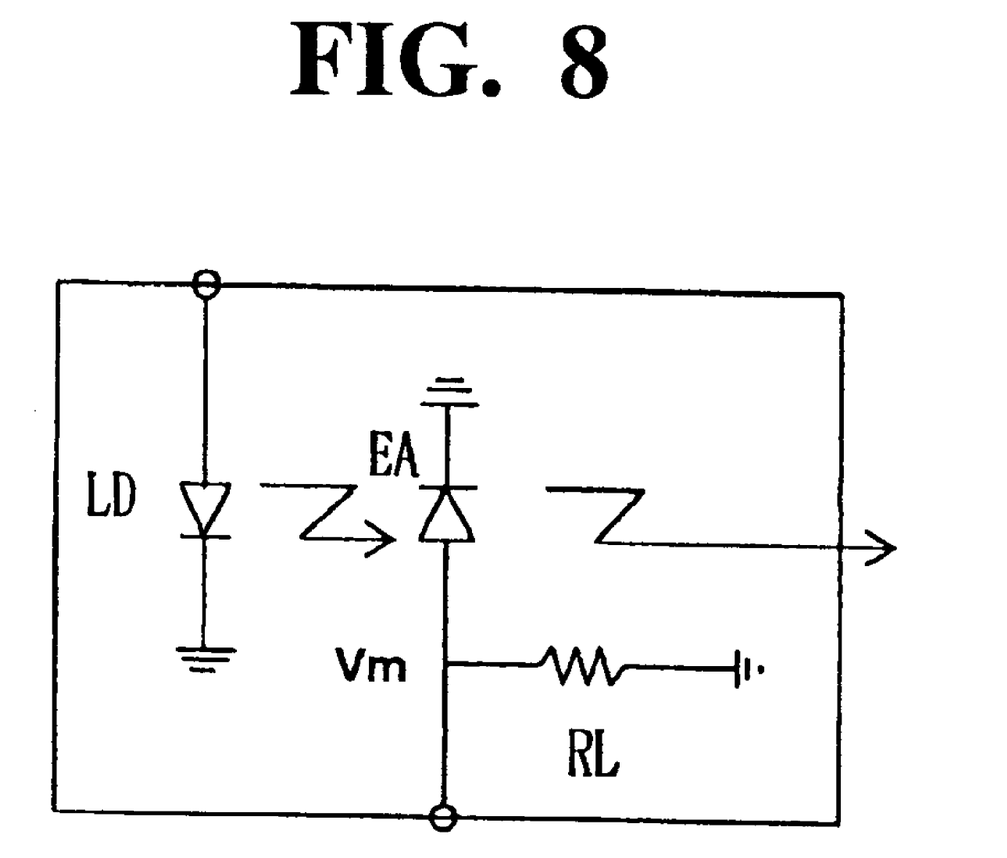
FIG. 8 shows an equivalent circuit formed by an electro-absorption modulator and a laser diode for radiating a carrier light.

In this example, optical modulator 2 and laser light source 10 (LD) can be illustrated by an equivalent circuit shown in FIG. 8. Optical modulator 2 is formed by connecting electro-absorption modulator EA with a resistor RL in parallel. The applying voltage Vm at the anode of electro-absorption modulator EA is generated by flowing a current to resistor RL. Further, laser light source 10 is illustrated by a laser diode LD.

Figure 9:
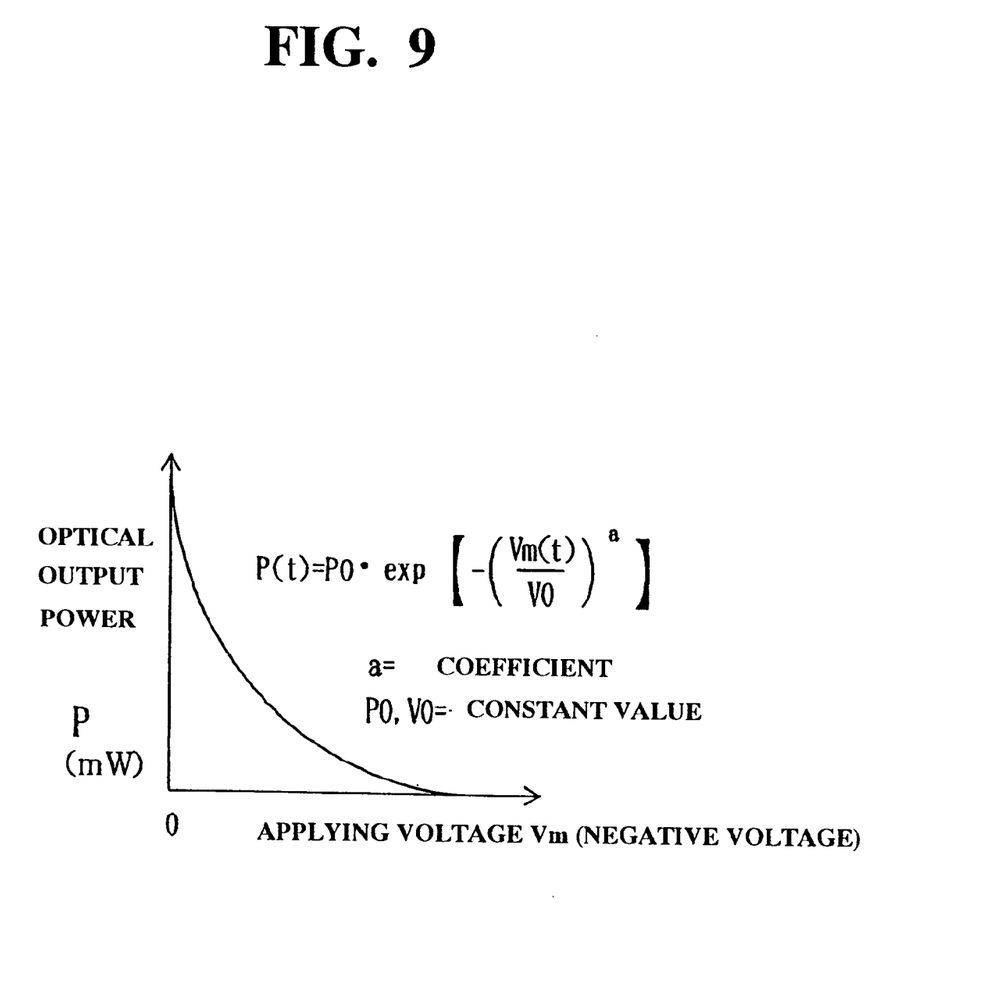
FIG. 9 illustrates an optical output characteristic of the electro-absorption modulator EA for the applying voltage Vm.

An optical output characteristic of electro-absorption modulator EA for the applying voltage Vm can be expressed by an equation approximated to exp, as shown in FIG. 9. It is apparent from the characteristic shown in FIG. 9 that optical output power P becomes maximum, when the applying voltage Vm is zero, i.e., light absorption in electro-absorption modulator EA is not effected and optical power of the carrier light radiated from laser light source 10 is outputted as it is when the applying voltage Vm is zero.

On the contrary, when the applying voltage Vm becomes larger, the optical output power becomes smaller by the light absorption as constructed by a curve approximated to exp. That is, a rate for absorbing the carrier light radiated from laser light source 10 in electro-absorption modulator EA becomes larger.

Optical power radiated from laser light source 10 can be absorbed in electro-absorption modulator EA, as converted to an optical current. The optical current is called as Iph which varies according to the applying voltage Vm shown in FIG. 10.

Figures 11A, 11B, 11C:
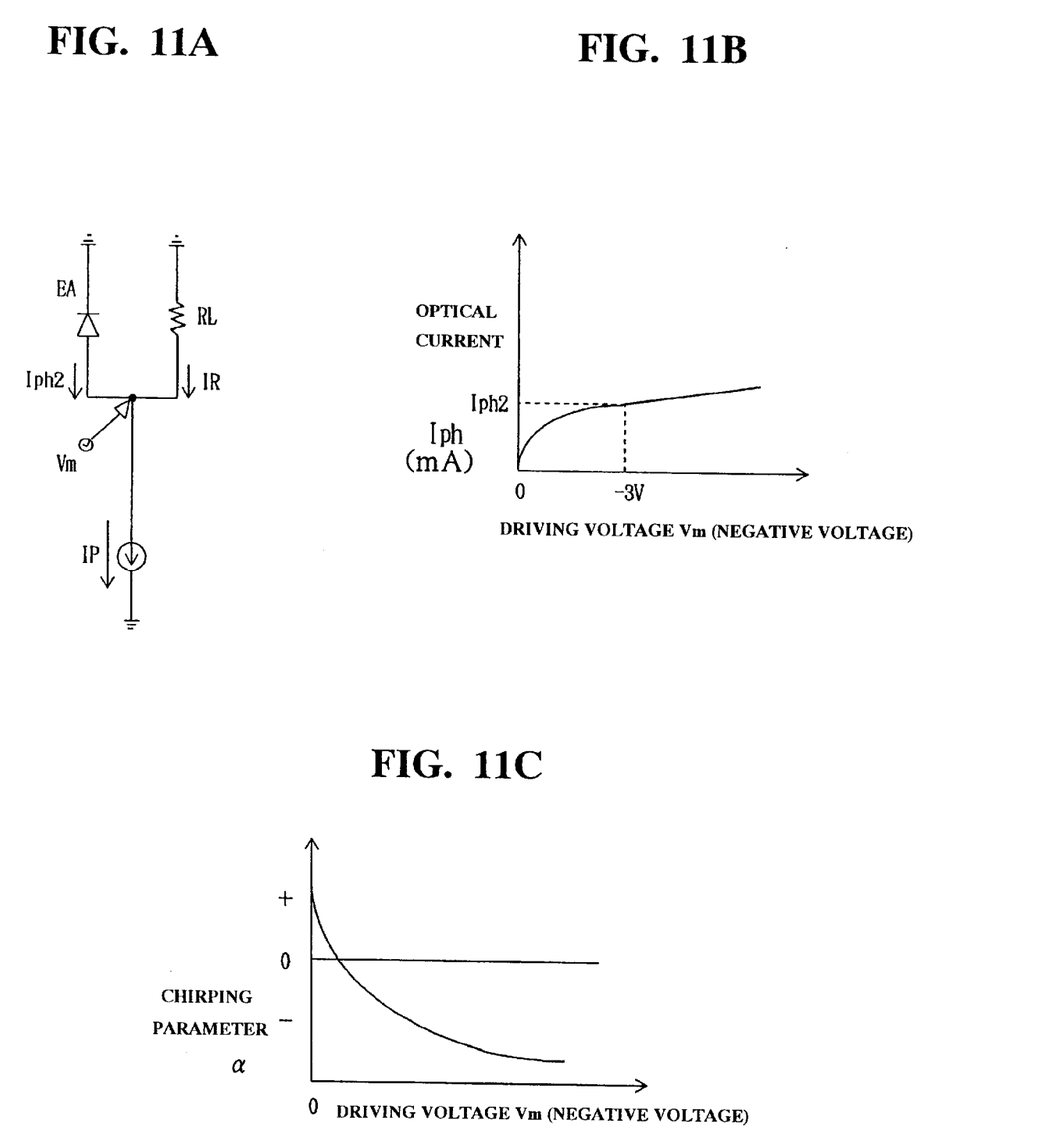
FIGS. 11A, 11B and 11C are diagrams for considering a current flowing to an electro-absorption modulator EA and a resistor RL forming the electro-absorption optical modulator 2.

The current flowing to electro-absorption modulator EA and resistor RL which form optical modulator 2 will be now considered in accompanying to FIGS. 11A, 11B and 11C.

In FIG. 11A, a current driven by a modulating signal, i.e., an input signal, is IP, an optical current flowing to electro-absorption modulator EA is Iph2, and a current flowing to resistor RL is IR.

(1) As shown in FIG. 11B, if Iph1=0 mA, $$Vm = IR \times RL = (Ip - Iph2) \times RL \qquad (1)$$

For example, if Iph2=20 mA and RL=50Ω when the value of Vm should be −3V, $$Vm = 60 \text{ mA} \times 50 = (80 \text{ mA} - 20 \text{ mA}) \times 50.$$

Accordingly, it is required to have a capability for flowing an extra current of Iph2=20 mA on the current IP driven by the modulating signal.

Figure 10:
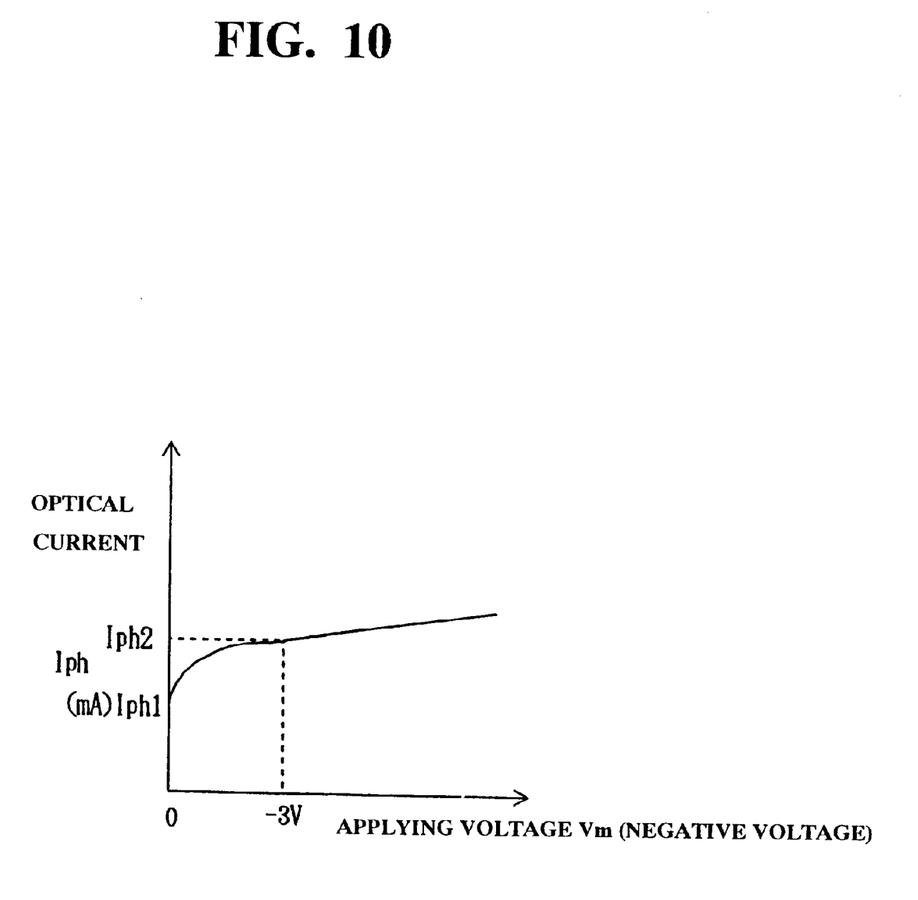
FIG. 10 is a diagram illustrating an example of an optical current characteristic.

(2) When Iph1>0 mA, it can be understood that the carrier light can be absorbed to flow the optical current even if Vm=0V as shown in FIG. 10 as a characteristic of an optical modulator.

For example, in a circuit of FIG. 11A, when Vm=0V, Ip becomes 0 mA. However, if the condition of IP=0 mA is substituted into the equation (1), Vm can be expressed as:

$$Vm = (0 - Iph1) \times RL = -Iph1 \times RL \neq 0 \qquad (2)$$

where Vm is negative voltage.

Therefore, it becomes apparent from the above-described equation that the relation is inconsistency.

Actually, the optical current Iph1 is flowing to resister RL. Vm can be obtained by Iph1×RL, and therefore, it becomes positive voltage.

In here, a chirping parameter α, which may determine a transmission characteristic depends on the voltage Vm, as shown in FIG. 11C. Fluctuation of the chirping parameter α becomes larger near at Vm=0V.

Figure 12A:
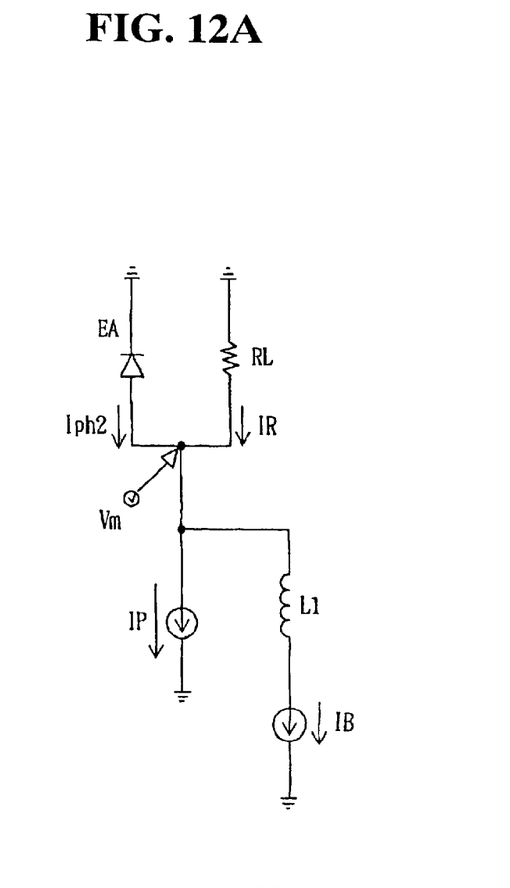
FIGS. 12A and 12B are explanatory diagrams of necessity of a bias current drive circuit for drawing an optical current Iph1.

Therefore, when the condition becomes to Vm>0V, the transmission characteristic can not be guaranteed because the fluctuation of the chirping parameter α becomes larger. Therefore, a circuit for drawing the optical current Iph1 is required as shown in FIG. 12.

In this case, Vm can be calculated as follows;

$$Vm = IR \times RL = (Ip + IB - Iph2) \times RL = \{(Ip - Iph2 + Iph1) + (IB - Iph1)\} \times RL \qquad (3)$$

As IB=Iph1 in the equation (3), Vm=0 when Ip=0 mA.

Figure 12B:
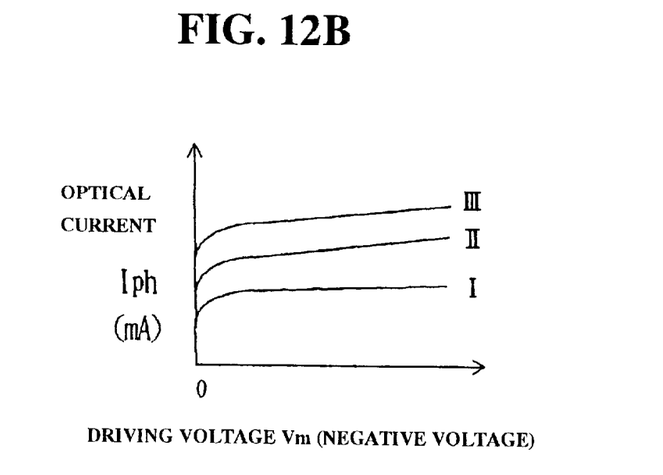

It is general to control pulse current Ip and bias current IB to be constant not as changed by temperature variation and a secular change. However, when the optical current characteristic fluctuates from I to III as shown in FIG. 12B, IB is not equal to Iph1, and therefore, Vm is changed by the equation (3).

As the result, the transmission characteristic can not be made constant as α parameter is changed. Further, when there is a dispersion on each characteristic of electro-absorption modulator EA in optical modulator 2 similarly to the above-described case, it is required to control each electro-absorption modulator, and therefore, plural steps of adjustment are required.

SUMMARY OF THE INVENTION

Accordingly, it is an object of the present invention to provide a drive circuit for electro-absorption modulator for making bias current IB in the optical modulator with no adjustment to stabilize a transmission characteristic even if a rate of optical current is fluctuated according to temperature and secular changes, as not depending on the optical modulator employing the electro-absorption modulator EA having a different optical current characteristic, and to provide an optical transmitter using the drive circuit.

Other objects of the present invention will become clear by the description for explaining embodiments according to the attached drawings.

To attain the above-described problems, a drive circuit for supplying a driving voltage to an electro-absorption modulator adsorbs a carrier light, depending on the driving voltage and outputs an intensity-modulated signal.

It is one feature of the present invention that the drive circuit includes a peak value detector for detecting a peak value of a voltage at an anode of the electro-absorption modulator and a bias current supplying circuit for supplying a bias current to control the driving voltage according to a difference between the peak value detected by the peak value detector and a predetermined value.

Further, the peak value detector can be structured so as to detect a peak value of a voltage at a cathode of the electro-absorption modulator.

Additionally, to attain the above-described problems, an optical transmitter includes a light source to which a driving current is supplied for generating a carrier light having an intensity corresponding to the driving current, an electro-absorption modulator for receiving the carrier light, adsorbing the received carrier light, and outputting an intensity-modulated signal, depending on an applying voltage, a bias supplying circuit for supplying an offset voltage to the electro-absorption modulator to set the applying voltage within a stable region of the carrier light generated from the light source, a peak value detecting circuit for detecting a peak value at an anode of the electric-field absorption, and a bias current supplying circuit for supplying a bias current to control the applying voltage according to a difference between the value detected by the peak value detecting circuit and a predetermined value.

In the structure of the above-described optical transmitter, it is a feature of the present invention that the optical transmitter includes a peak value detecting circuit for detecting a peak value of a voltage generated by a cathode current of the electro-absorption modulator and a bias current supplying circuit for supplying a bias current to control the applying voltage according to a difference between the value detected by the peak value detecting circuit and a predetermined value.

In carrying out the present invention in a detailed mode, the light source is a laser diode having anode and cathode terminals and the electro-absorption modulator is an electro-adsorption laser diode having anode and cathode terminals.

In the above-described structure, the light source is a laser diode, and the laser diode and the electro-absorption modulator are formed on a single semiconductor chip.

In addition, in an other mode of the present invention, the optical transmitter includes a laser diode to which a driving current is supplied for generating a carrier light having an intensity corresponding to the driving current, a first electro-absorption modulator for receiving the carrier light, adsorbing the carrier light, and outputting an intensity-modulated signal, depending on an applying voltage, a second electro-absorption modulator formed on a single chip where the first electro-absorption modulator is provided, a current monitor circuit for detecting an optical current flowing the second electro-absorption modulator, and a bias current supplying circuit for supplying a bias current to control the applying voltage according to a difference between the value of the optical current detected by the current monitor circuit and a predetermined value.

In the above-described structure, the laser diode for generating the carrier light of which intensity is corresponding to the driving current is formed on the same single semiconductor chip unitedly with the first and second electro-absorption modulators.

DESCRIPTION OF THE PREFERRED EMBODIMENTS

Embodiments according to the present invention will be now explained in accompanying with the attached drawings. Throughout the following descriptions, the same reference numerals and symbols are used to denote and identify corresponding or identical components.

Figure 1:
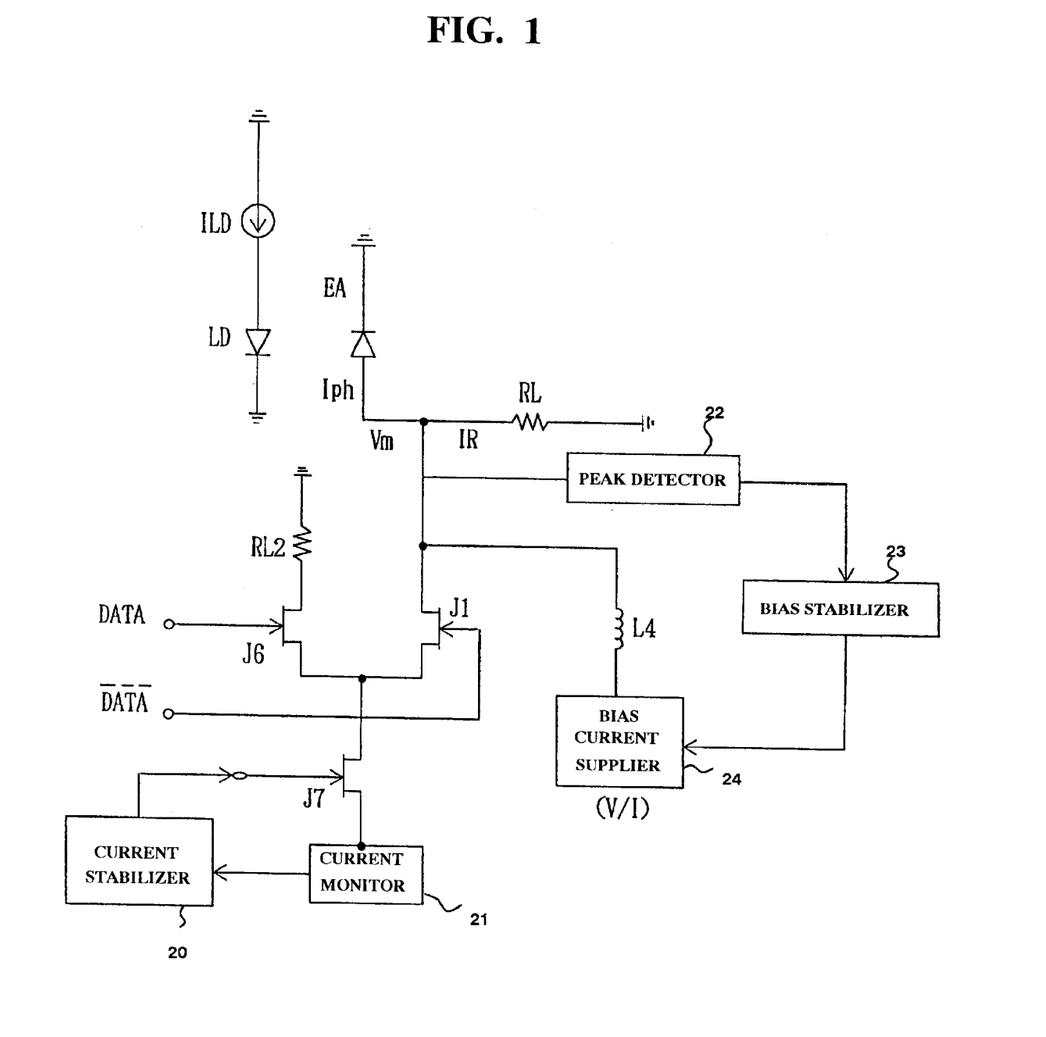
FIG. 1 shows a first embodiment according to the present invention.

FIG. 1 shows a first embodiment according to the present invention. It is a feature of circuit shown in FIG. 1 to detect a voltage Vm at the anode of electro-absorption modulator EA in optical modulator 2 and to control it to be always zero.

That is, FIG. 1 shows a drive circuit for supplying a driving current to optical modulator 2 so that a differential pair of FETs J1 and J6 gives a driving voltage to electro-absorption modulator EA as a modulating signal corresponding to an input signal DATA.

A constant current source which is formed by a FET J7 is added to a commonly used source of the differential pair forming the drive circuit.

The constant current source formed by FET J7 detects the current in a current monitor 21. A current stabilizer 20 feeds-back a gate voltage to FET J7 so that the detected current is to be constant.

Further, a peak detector 22 for detecting a peak value of the applying voltage Vm at the anode of electro-absorption modulator EA is provided in the circuit shown in FIG. 1 according to the feature of the present invention. A bias stabilizer 23 compares the peak value voltage detected in peak detector 22 and a reference voltage, i.e., 0V in this embodiment.

Bias stabilizer 23 has a comparing function and a function for outputting a differential voltage, i.e., the result of the comparison. The differential voltage obtained from bias stabilizer 23 is inputted to bias current supplier 24. Bias current supplier 24 has a function for converting the voltage to a current corresponding to the inputted differential voltage.

Bias current supplier 24 further subtracts the converted current corresponding to the differential voltage from the driving current outputted from the drive circuit formed of the differential pair of FETs J1 and J6, i.e., supplies the current converted corresponding to the differential voltage to the driving current outputted from the drive circuit in the reversed direction.

Therefore, the current flowing to resistor RL is feeds back to control the voltage Vm at the anode of electro-absorption modulator EA to be zero, thereby stabilizing the transmission characteristic.

In FIG. 1, an inductance L4 functions to remove high-frequency components.

A technique relating to bias circuit control in an external optical modulator is described in Japanese laid open patent publication No. 4-61390 as one example. In the technique described in the Japanese patent publication, an output power is controlled to be constant by using an average optical current.

When a relationship between a driving voltage and optical current characteristic for electro-absorption modulator EA in optical modulator 2 is varied as shown in FIG. 12A, the driving voltage is fluctuated. Therefore, α parameter important to the transmission characteristic is changed and a characteristic for realizing long distance transmission is deteriorated.

On the contrary, according to the present invention, the driving voltage is stabilized, and therefore, α parameter is universality. Accordingly, the characteristic for realizing the long distance transmission is not deteriorated.

Figure 2:
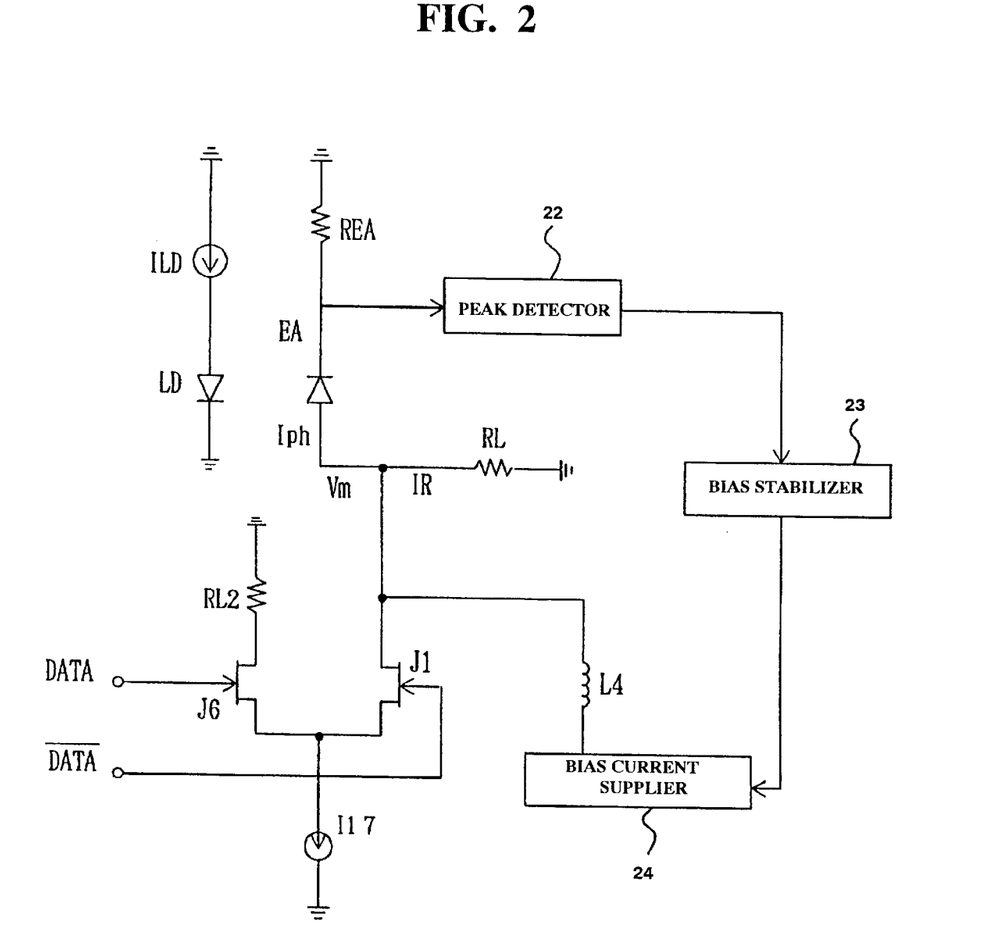
FIG. 2 shows a second embodiment according to the present invention.

FIG. 2 shows a second embodiment according to the present invention. In comparison with the circuit shown in FIG. 1, it is a different point to connect peak detector 22 to a cathode of electro-absorption modulator EA in the optical modulator 2. A constant current source formed of a FET J7 is not shown in FIG. 2 for simplicity. However, principle operations are the same as those of the embodiment shown in FIG. 1. Therefore, further explanation will be omitted here.

In FIG. 2, a resistor REA is connected in serial to a cathode of electro-absorption modulator EA in order to connect peak detector 22 to the cathode of electro-absorption modulator EA in optical modulator 2 and obtain the voltage corresponding to the optical current.

As peak detector 22 is connected to the cathode of electro-absorption type optical modulator EA, it is possible to reduce influence of high-frequency and detect a peak of the optical current.

As explained in FIG. 11C, influence of chirping becomes larger near the point where the driving voltage for electro-absorption modulator EA be 0V. Therefore, the present applicant proposed a circuit in which the applying voltage is further shifted to a negative direction to use in a region where α parameter fluctuation is small (for example, refer to FIG. 5 in Japanese laid open patent Publication No. 8-316580).

Figure 3:
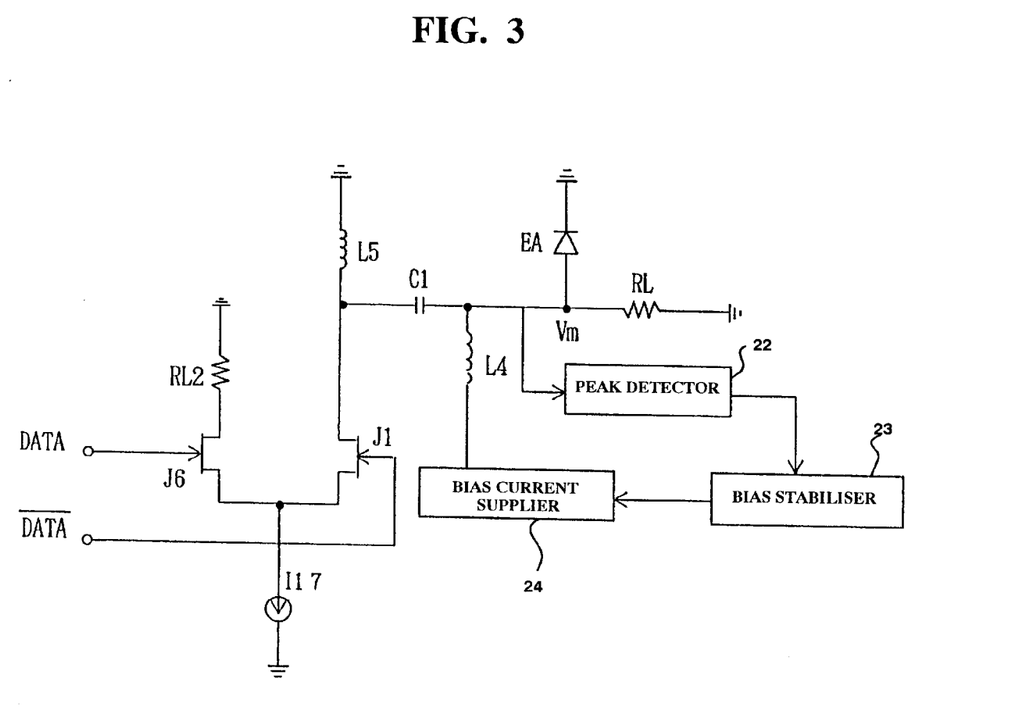
FIG. 3 shows a third embodiment according to the present invention.

FIG. 3 shows a third embodiment according to the present invention. It is an example applying the present invention to the circuit previously proposed by the present applicant. That is, a condenser C1 separates a drive circuit formed of FETs J6 and J1 from an anode of electro-absorption modulator EA in direct current in the previously proposed circuit. Further, a negative voltage (offset voltage) is supplied to the anode of electro-absorption modulator EA.

In the embodiment of FIG. 3 according to the present invention, peak detector 22, bias stabilizer 23 and bias current supplier 24 control the voltage Vm at the anode of electro-absorption modulator EA to be of a negative constant voltage where influence of chirping is small in the previously proposed circuit, similarly to FIG. 1.

In the embodiment of FIG. 3, it is also possible to connect the peak detector 22 so as to detect the voltage generated by the optical current flowing to connect resistor REA at the cathode of electro-absorption modulator EA, similarly to the embodiment of FIG. 2.

Figure 4:
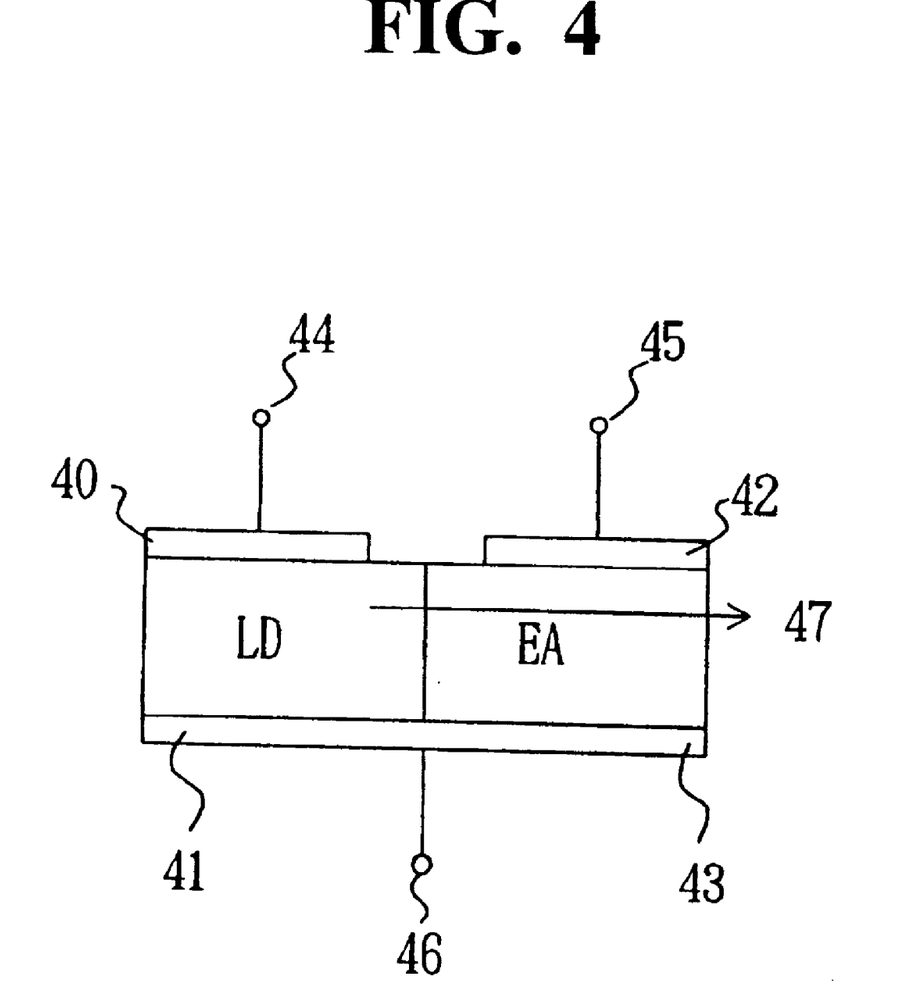
FIG. 4 shows one structural example of an optical modulator integrated DFB laser in which a laser diode LD and an electro-absorption modulator EA are united.

Structures of a laser diode LD for generating carrier light and electro-absorption modulator EA for the optical modulator to which the present invention can be applied will be now considered. FIG. 4 is one structural example of an integrated optical modulator and DFB laser in which an electro-absorption modulator EA and a laser diode LD are united.

For example, the integrated optical modulator arid DFB laser is formed of a semiconductor chip having a direct coupling wave-guide including multiple quantum well (MQW) layers made of GaInAs. Laser Diode LD which generates a carrier light has first and second terminals 40 and 41 for supplying the driving current. Electro-absorption modulator EA has third and fourth terminals 42 and 43 for the applying voltage being supplied.

Laser diode LD and electro-absorption modulator EA are united, and therefore, the second and fourth terminals 41 and 43 are also united in the example shown in FIG. 4. First and second terminals 40 and 42 are respectively connected to lead lines 44 and 45. A commonly used lead line 46 is connected to the united second and fourth terminals 41 and 43.

In FIG. 4, an arrow 47 is a forward light radiated from laser diode LD for transmitting through electro-absorption modulator EA.

Figure 5:
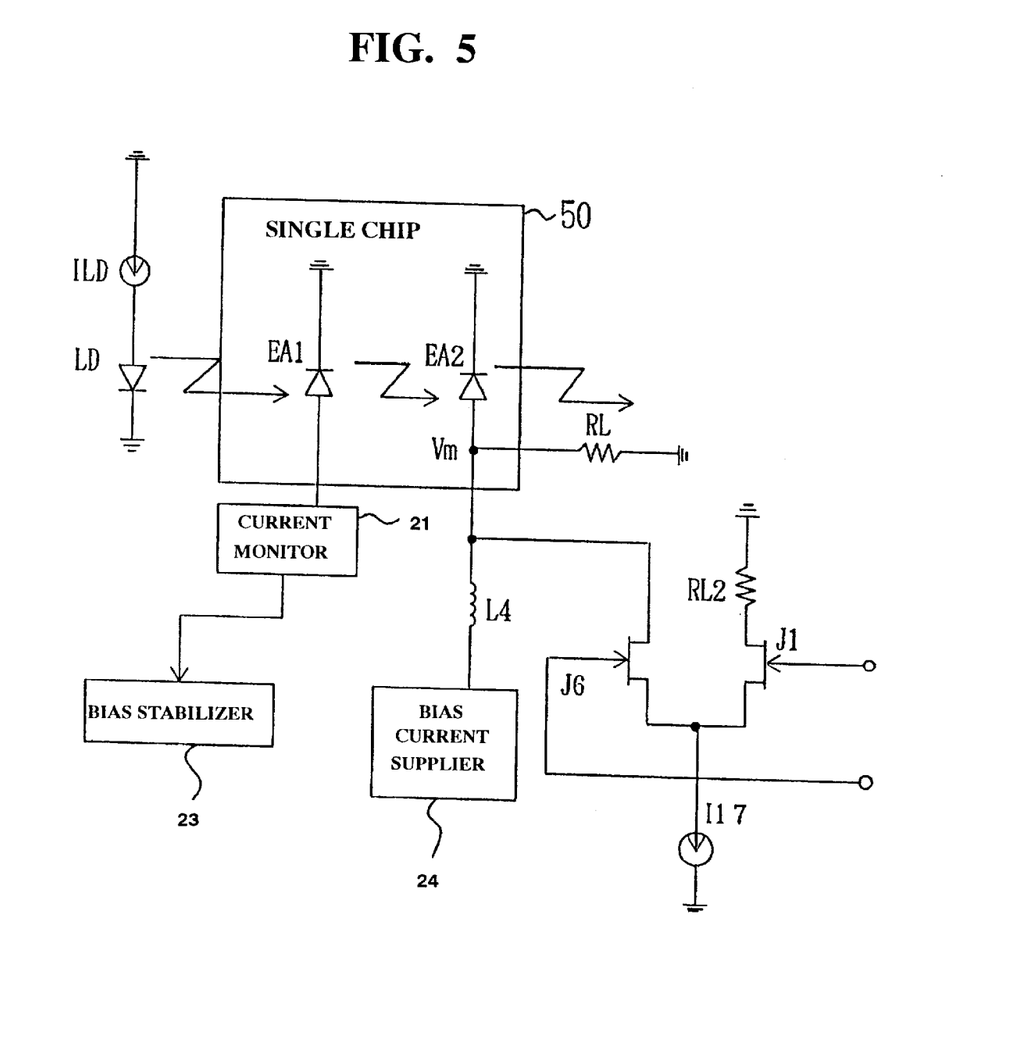
FIG. 5 shows a fourth embodiment according to the present invention.
Figure 6:
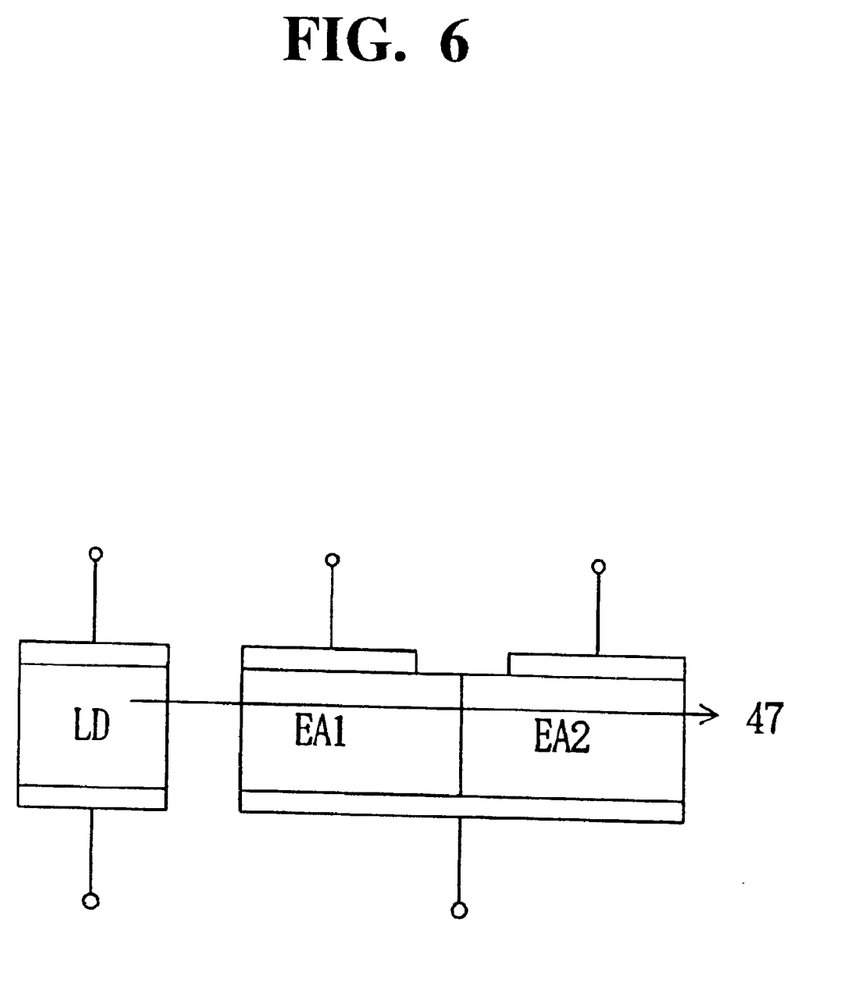
FIG. 6 shows an example for forming two electro-absorption modulators EA having a same structure for optical modulation on single semiconductor chip.

FIG. 5 shows a fourth embodiment according to the present invention. This is an example for employing two electro-absorption modulators EA for optical modulation having a same structure formed on single semiconductor chip as shown in FIG. 6.

First and second electro-absorption modulators EA1 and EA2 are united and formed on a semi-conductor chip 50, similarly to the structure explained in FIG. 4. Returning to FIG. 5, a current monitor circuit 21 of first electro-absorption modulator EA1 on semiconductor chip 50 monitors the optical current of the carrier light radiated from laser diode LD.

Bias stabilizer 23 and bias current supplier 24 control a bias current of second current-absorption modulator EA2 according to the optical current detected by monitor circuit 21.

In comparison with the control methods in other embodiments, the circuit in the embodiment of FIG. 5 performs feed forward control in contrast to the feed back control. The reason for feed-forward control being performed is because two electro-absorption modulators EA1 and EA2 are formed on the single semiconductor chip 50 and can be formed with a same process, thereby having the same characteristic.

Further, in FIG. 5, laser diode LD for outputting carrier light is separately provided from the semiconductor chip on which electro-absorption modulators EA1 and EA2 are provided. It is also possible to form laser diode LD as well as electro-absorption modulators EA1 and EA2 on a single chip, similarly to the embodiment of FIG. 4.

As explained in accompanying the drawings, in the present invention, the anode voltage of electro-absorption modulator EA of the optical modulator is detected to control the bias current so that the applying voltage becomes constant. Thereby, even if the optical current is changed according to temperature and a secular change, the applying voltage to electro-absorption modulator EA can be constant, and therefore, it becomes possible to prevent from deteriorating a transmission characteristic.

Further, when electro-absorption modulators having different optical currents are employed, i.e., there is a dispersion on a characteristic of the electro-absorption modulator EA in the optical modulator, it is possible to make the applying voltage of the optical modulator constant with no control.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A drive circuit for supplying a driving voltage to an electro-absorption modulator which adsorbs a carrier light, depending on the driving voltage and outputting an intensity-modulated signal comprising:
   a peak value detector for detecting a peak value of a voltage at an anode of the electro-absorption modulator; and
   a bias current supplying circuit for supplying a bias current to control the driving voltage according to a difference between the peak value detected by the peak value detector and a predetermined value.

2. A drive circuit for supplying a driving voltage to an electro-absorption modulator which adsorbs a carrier light, depending on the driving voltage and outputting an intensity-modulated signal comprising:
   a peak value detector for detecting a peak value of a voltage generated by a cathode current of the electro-absorption modulator; and
   a bias current supplying circuit for supplying a bias current to control the driving voltage according to a difference between the peak value detected by the peak value detector and a predetermined value.

3. An optical transmitter comprising:
   a light source to which a driving current is supplied or generating a carrier light having an intensity corresponding to the driving current;
   an electro-absorption modulator for receiving the carrier light, adsorbing the received carrier light, and outputting an intensity-modulated signal, depending on an applying voltage;
   a bias supplying circuit for supplying an offset voltage to the electro-absorption modulator to set the applying voltage within a stable region of the carrier light generated from the light source;
   a peak value detecting circuit for detecting a peak value at an anode of the electric-field absorption; and
   a bias current supplying circuit for supplying a bias current to control the applying voltage according to a difference between the value detected by the peak value detecting circuit and a predetermined value.

4. The optical transmitter according to claim 3, wherein the light source is a laser diode, and the laser diode and the electro-absorption modulator are formed on a single semiconductor chip.

5. An optical transmitter comprising:
   a light source to which a driving current is supplied for generating a carrier light having an intensity corresponding to the driving current;
   an electro-absorption modulator for receiving the carrier light, adsorbing the received carrier light, and outputting an intensity-modulated signal, depending on an applying voltage;
   a bias supplying circuit for supplying an offset voltage to the electro-absorption modulator to set the applying voltage within a stable region of the carrier light generated from the light source;
   a peak value detecting circuit for detecting a peak value of a voltage generated by a cathode current of the electro-absorption modulator; and
   a bias current supplying circuit for supplying a bias current to control the applying voltage according to a difference between the value detected by the peak value detecting circuit and a predetermined value.

6. The optical transmitter according to claim 4, wherein the light source is a laser diode, and the laser diode and the electro-absorption modulator are formed on a single semiconductor chip.

7. An optical transmitter comprising:
   a laser diode to which a driving current is supplied for generating a carrier light having an intensity corresponding to the driving current;
   a first electro-absorption modulator for receiving the carrier light, adsorbing the carrier light, and outputting an intensity-modulated signal, depending on an applying voltage;
   a second electro-absorption modulator formed on a single chip where the first electro-absorption modulator is provided;
   a current monitor circuit for detecting an optical current flowing the second electro-absorption modulator; and
   a bias current supplying circuit for supplying a bias current to control the applying voltage according to a difference between the value of the optical current detected by the current monitor circuit and a predetermined value.

8. The optical transmitter according to claim 7, wherein the laser diode for generating the carrier light of which intensity is corresponding to the driving current is formed on the same single semiconductor chip unitedly with the first and second electro-absorption modulators.

* * * * *